(12) United States Patent
Selinger et al.

(10) Patent No.: US 10,109,166 B1
(45) Date of Patent: Oct. 23, 2018

(54) SYSTEM AND METHOD FOR A SECURITY CHECKPOINT USING RADIO SIGNALS

(71) Applicants: David Lee Selinger, Pleasanton, CA (US); Ching-Wa Yip, Hong Kong (CH); Chaoying Chen, Taiwan (CH)

(72) Inventors: David Lee Selinger, Pleasanton, CA (US); Ching-Wa Yip, Hong Kong (CH); Chaoying Chen, Taiwan (CH)

( * ) Notice: Subject to any disclaimer, the term of this patent is extended or adjusted under 35 U.S.C. 154(b) by 0 days.

(21) Appl. No.: 15/492,008

(22) Filed: Apr. 20, 2017

(51) Int. Cl.
*G08B 13/22* (2006.01)
*G07C 9/00* (2006.01)
*G08B 27/00* (2006.01)
*G01S 5/02* (2010.01)

(52) U.S. Cl.
CPC ............ *G08B 13/22* (2013.01); *G01S 5/0284* (2013.01); *G07C 9/00111* (2013.01); *G08B 27/005* (2013.01)

(58) Field of Classification Search
CPC ..... G08B 13/22; G08B 27/005; G01S 5/0284; G07C 9/00103; G07C 9/00111; G07C 5/008; G06F 21/32; G06F 17/30864; H04L 63/08; H04W 12/06; G06C 30/02; G06C 30/0241; G07B 15/02; G06Q 30/02; G06Q 30/0241
See application file for complete search history.

(56) References Cited

U.S. PATENT DOCUMENTS

| | | | | |
|---|---|---|---|---|
| 9,245,433 B1* | 1/2016 | Butler | .................... | G08B 13/00 |
| 9,681,263 B1* | 6/2017 | Butler | .................... | H04W 4/02 |
| 9,697,387 B1* | 7/2017 | Bowman | .............. | G06K 7/0008 |
| 2004/0168069 A1* | 8/2004 | Knight | ................... | G06Q 10/10 |
| | | | | 713/186 |
| 2005/0039014 A1* | 2/2005 | Sajkowsky | ............ | G06K 17/00 |
| | | | | 713/172 |
| 2007/0087763 A1* | 4/2007 | Budampati | ........... | H04W 12/06 |
| | | | | 455/456.5 |
| 2008/0229382 A1* | 9/2008 | Vitalos | ................ | H04L 63/0263 |
| | | | | 726/1 |
| 2009/0266882 A1* | 10/2009 | Sajkowsky | ............ | G06K 17/00 |
| | | | | 235/380 |
| 2012/0310972 A1* | 12/2012 | Wohl | ...................... | G06Q 50/00 |
| | | | | 707/769 |
| 2012/0323763 A1* | 12/2012 | Michael | ................. | G06Q 30/02 |
| | | | | 705/39 |
| 2012/0323767 A1* | 12/2012 | Michael | ................. | G06Q 40/00 |
| | | | | 705/39 |

(Continued)

*Primary Examiner* — Orlando Bousono
(74) *Attorney, Agent, or Firm* — James M. Smedley LLC; James Michael Smedley, Esq.

(57) ABSTRACT

A security device for monitoring the radio frequency signals generated by mobile phones and similar mobile computing and communication devices. The security device employs an antennae array and computer process that are configured to detect and provide a "fingerprint" for a mobile device based on the unique identifiers contained with the radio and other wireless signals utilized by such mobile device. The "fingerprint" that is obtained can be used to keep track of mobile devices as those devices enter and leave the area of the security device. Moreover, the security device can provide an alert when any new, foreign, or otherwise unrecognized device is within range of the security device and share "fingerprints" and alerts with other security devices in its network.

13 Claims, 4 Drawing Sheets

(56) References Cited

U.S. PATENT DOCUMENTS

| | | | | |
|---|---|---|---|---|
| 2012/0323769 A1* | 12/2012 | Michael | ........... | G06Q 30/02 |
| | | | | 705/39 |
| 2012/0323770 A1* | 12/2012 | Michael | ........... | G06Q 30/02 |
| | | | | 705/39 |
| 2012/0323771 A1* | 12/2012 | Michael | ........... | G06Q 40/00 |
| | | | | 705/39 |
| 2012/0323772 A1* | 12/2012 | Michael | ........... | G06Q 40/00 |
| | | | | 705/39 |
| 2013/0127592 A1* | 5/2013 | Fyke | ........... | G06F 21/32 |
| | | | | 340/5.53 |
| 2014/0075514 A1* | 3/2014 | Prasad | ........... | G06F 21/78 |
| | | | | 726/4 |
| 2014/0077927 A1* | 3/2014 | Mattern | ........... | G07C 9/00087 |
| | | | | 340/5.7 |
| 2014/0354406 A1* | 12/2014 | Fyke | ........... | G06F 21/32 |
| | | | | 340/5.83 |
| 2014/0361869 A1* | 12/2014 | Prasad | ........... | G06F 21/78 |
| | | | | 340/5.6 |
| 2014/0363060 A1* | 12/2014 | Wohl | ........... | G06Q 50/00 |
| | | | | 382/124 |
| 2014/0371950 A1* | 12/2014 | Michael | ........... | G06Q 30/02 |
| | | | | 701/1 |
| 2015/0150101 A1* | 5/2015 | Novack | ........... | G07C 9/00111 |
| | | | | 726/7 |
| 2015/0206045 A1* | 7/2015 | Gazdzinski | ........... | G06Q 10/08 |
| | | | | 235/492 |
| 2015/0350914 A1* | 12/2015 | Baxley | ........... | H04W 12/08 |
| | | | | 726/11 |
| 2016/0248770 A1* | 8/2016 | Novack | ........... | G07C 9/00111 |
| 2016/0275731 A1* | 9/2016 | Prasad | ........... | G06F 21/78 |
| 2016/0381027 A1* | 12/2016 | Mitchell | ........... | H04L 63/10 |
| | | | | 726/3 |
| 2017/0126648 A1* | 5/2017 | Bond | ........... | G06F 9/542 |

* cited by examiner

SYSTEM AND METHOD FOR A SECURITY CHECKPOINT USING RADIO SIGNALS

FIELD OF THE INVENTION

The present invention generally relates to a security checkpoint or virtual gate. Specifically, embodiments of the present invention relate to a device and method for listening to the radio frequency signals generated by mobile phones and similar mobile computing and communication devices and "fingerprinting" a given device based on unique identifies within those radio frequency signals.

BACKGROUND OF THE INVENTION

Presently available security systems primarily rely on a combination of a physical human presence (i.e. a security guard), reactive alarms (e.g. motion sensor, glass break sensor, and open/close sensors), and security cameras to provide security. The primary goal of these types of systems is to deter illegal and malicious activity and to provide an alert when such activity occurs. However, these systems have a limited detection range and lack both proactive alert and enhanced tracking capabilities. Furthermore, these systems are deficient in their ability to analyze patterns and to monitor and detect an individual person by something other than by visual identification.

Therefore, there is a need in the art for a system and method that monitors and detects the presence of a person by something other than visual observation or the breach of physical barrier or sensor. Additionally, there is a need for a system and method for a security system that has an increased detection range and the ability to provide proactive alerts. These and other features and advantages of the present invention will be explained and will become obvious to one skilled in the art through the summary of the invention that follows.

SUMMARY OF THE INVENTION

Accordingly, embodiments of the present invention are directed to a system and method for a security system that monitors the radio frequency signals generated by mobile phones and similar mobile computing devices to then create a unique identifier or "fingerprint" for each such mobile device. The "fingerprint" is comprised of one or more identifiers that are unique to the signals being generated by the given device. Having established a "fingerprint," the system can use that information to provide an alert when an unrecognized or unauthorized device is detected. Furthermore, the security system can be integrated with more traditional security system components, such as a security camera.

According to an embodiment of the present invention, a system for a security checkpoint using radio signals, the system comprising: a wireless signal receiver, a device fingerprinting module comprising computer executable code stored in non-volatile memory, a processor, a memory, and a communications means, wherein the wireless signal receiver, the device fingerprinting module, the processor, the memory, and the communications means are operably connected and are configured to: monitor an area for the presence of a mobile device, detect one or more radio signals emitted by the mobile device, generate a device fingerprint that positively identifies the mobile device, and upload the device fingerprint to a device fingerprint database to be accessed by a network of other security checkpoints.

According to an embodiment of the present invention, the wireless signal receiver, the device fingerprinting module, the processor, the memory, and the communications means are operably connected and are further configured to: determine whether the device fingerprint matches any recognized device stored in the device fingerprint database, and issue an alert notification if the device fingerprint does not match any stored in the device fingerprint database.

According to an embodiment of the present invention, the wireless signal receiver, the device fingerprinting module, the processor, the memory, and the communications means are operably connected and are further configured to: receive an alarm notification from one or more security devices, record all mobile devices that are in range of the system as potential suspect devices, compare the potential suspect devices against recognized devices in the device fingerprint database, and generate a list of one or more suspect devices.

According to an embodiment of the present invention, the wireless signal receiver, the device fingerprinting module, the processor, the memory, and the communications means are operably connected and are further configured to issue an alert when one or more of the suspect devices enters any of the security checkpoint on the network.

According to an embodiment of the present invention, the security devices are one or more of a group of security devices consisting of security cameras, motion detectors, glass break alarms, and open/close sensors.

According to an embodiment of the present invention, the wireless signal receiver, the security checkpoint forms a swarm with other security checkpoints connected to a common network, wherein the device fingerprinting module, the processor, the memory, and the communications means are operably connected and are further configured to issue alerts between each of the security checkpoints on the common network when an unrecognized device is detected by any of the checkpoints on the common network.

According to an embodiment of the present invention, the wireless signal receiver, the device fingerprinting module, the processor, the memory, and the communications means are operably connected and are further configured to triangulate a location of said mobile device.

According to an embodiment of the present invention, a method for a security checkpoint using radio signals, the method comprising: monitoring an area for the presence of a mobile device, detecting one or more radio signals emitted by the mobile device, generating a device fingerprint that positively identifies the mobile device, and uploading the device fingerprint to a device fingerprint database to be accessed by a network of other security checkpoints.

According to an embodiment of the present invention, the method further comprises the steps of determining whether the device fingerprint matches any recognized device stored in the device fingerprint database, and issuing an alert notification if the device fingerprint does not match any stored in the device fingerprint database.

According to an embodiment of the present invention, the method further comprises the steps of receiving an alarm notification from one or more security devices, recording all mobile devices that are in range of the system as potential suspect devices, comparing the potential suspect devices against recognized devices in the device fingerprint database, and generating a list of one or more suspect devices.

According to an embodiment of the present invention, the method further comprises the step of issuing an alert when one or more of the suspect devices enters any of the security checkpoint on the network.

According to an embodiment of the present invention, the method further comprises the step of issuing alerts between each security checkpoint on a common network when an unrecognized device is detected by any of the checkpoints on the common network.

According to an embodiment of the present invention, the method further comprises the step of triangulating a location of said mobile device using a network of security checkpoints.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED DESCRIPTION OF THE INVENTION

The present invention generally relates to a security checkpoint or virtual gate. Specifically, embodiments of the present invention relate to a device and method for listening to the radio frequency signals generated by mobile phones and similar mobile computing and communication devices and "fingerprinting" a given device based on unique identifies within those radio frequency signals.

Figure 1:
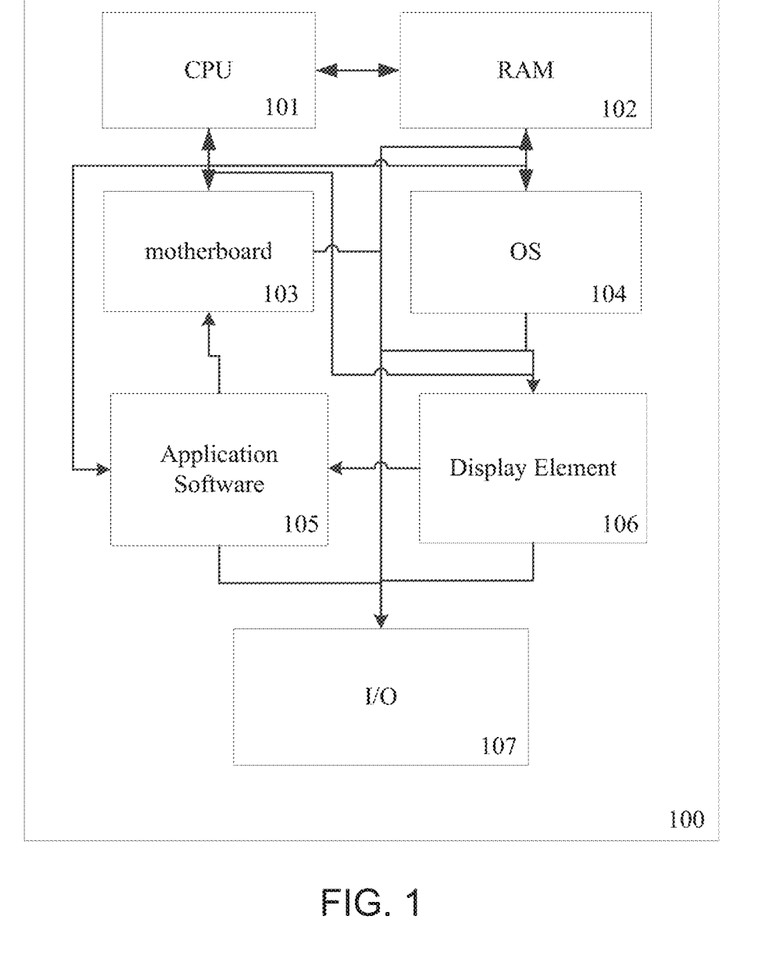
FIG. 1 illustrates a schematic overview of a computing device, in accordance with embodiments of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) and mother board 103, an operating system (OS) 104, one or more application software 105, display element 106 and one or more input/output devices/means 107. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

According to an exemplary embodiment of the present invention, data may be provided to the system, stored by the system and/or provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs.

One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network or the user may use copies of other resources which were cached when last the user was connected to a network.

Figure 2:
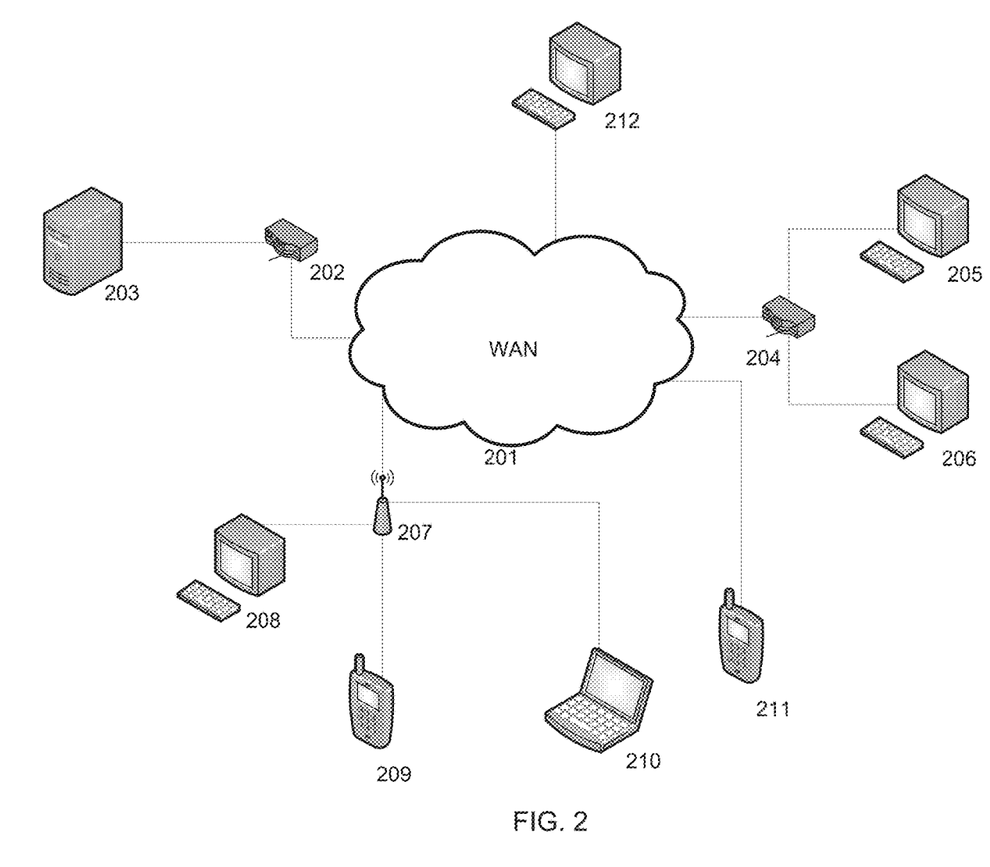
FIG. 2 illustrates a schematic overview of a network, in accordance with embodiments of the present invention.

Referring to FIG. 2, a schematic overview of a system in accordance with an embodiment of the present invention is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a radio antenna (or wireless access point) 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth® connections, or any combination thereof. One of ordinary skill in the art would appreciate that there are numerous communications means that may be utilized with embodiments of the present invention, and embodiments of the present invention are contemplated for use with any communications means.

According to an embodiment of the present invention, a system and method for providing a wireless security checkpoint that can monitor, identify, and track a mobile phone or similar communication device based on unique identifiers within the radio frequencies used by a given device. In a preferred embodiment, the wireless security check point is a hardware apparatus comprising at least a processor and one or more radio frequency antennas or similar wireless signal receiver. As a mobile device is in use, it is constantly emitting different types of radio signals as it, for example, checks for text messages or when searching for and connecting to cellular towers or wireless networks. Moreover, many of these radio signals contain distinct identifiers that are unique to a particular mobile device and the wireless security checkpoint apparatus can use those distinct identifiers to create a "fingerprint" that serves as a unique identification for mobile device.

According to an embodiment of the present invention, a "fingerprint" is established that identifies, or identifies to a high degree of probability, a particular mobile device. In a preferred embodiment, the "fingerprint" for a device is primarily based on unique identifiers within the radio frequency signals emitted by the mobile device. The "fingerprint" may also incorporate other elements that could be used to identify a mobile device including, but not limited to, a media access control (MAC) address, hardware identification, and network identity. One of ordinary skill in the art would appreciate that there are numerous identifiers that could be utilized to generate a "fingerprint", and embodiments of the present invention are contemplated to incorporate any such identifier.

According to an embodiment of the present invention, the security checkpoint hardware apparatus comprises at least a radio frequency antenna and a computer processing unit. In a preferred embodiment, the hardware apparatus is installed in security critical places such as a person's home or the entrance to a neighborhood. The device listens to the radio frequency signals generated by mobile devices, thereby providing an invisible and impossible to detect component to a security system. One of ordinary skill in the art would appreciate that the hardware apparatus could be configured to monitor for a wide spectrum of radio frequency signals simultaneously, thereby detecting a variety of communication devices that enter and exit the vicinity of the hardware apparatus.

According to an embodiment of the present invention, the security checkpoint hardware apparatus can be used to identify the regular visitors to a home or neighborhood. In a preferred embodiment, the security checkpoint hardware apparatus monitors for mobile devices that enter within range of the hardware apparatus. Upon detecting the presence of a device, the hardware apparatus will generate a "fingerprint" to uniquely identify the device, which in turn should be particular to a given individual. Furthermore, the hardware apparatus is configured to catalog the "fingerprint" of the various mobile devices it detects, thereby creating a database of mobile devices. The security checkpoint hardware apparatus can be programmed with or learn a set of recognized devices that corresponds to a list of recognized or approved visitors. Correspondingly, the security checkpoint hardware apparatus can be configured to detect the presence of an unrecognized or foreign device, which can indicate the presence of an unauthorized individual or potential threat, and issue an alert notification.

According to an embodiment of the present invention, the security checkpoint hardware apparatus prepares a database of detected "fingerprints." In a preferred embodiment, combining the "fingerprints" within an active central station allows for an additional layer of security, whereby the central station can share and filter data amongst a network of security checkpoints. This arrangement enables the network of security checkpoints to function as a swarm to accomplish two primary goals. First the network can listen and pool their information together, for example, as a cloud service. As an illustrative example, if one security checkpoint hardware apparatus detects the presence of a foreign device before a crime is committed and that same device is later detected by a different security checkpoint, then a security event could be initiated whereby other persons in the areas are notified as to the potential threat and the authorities are alerted as to the probable location of the device and in turn the possible suspect. Second, the network can act collectively to refine the "fingerprints" that have been captured. As an illustrative example, each security checkpoint in the network may be able to capture and contribute certain details about a given mobile device that were not captured by other checkpoints in the network. By doing this, the network is able to create a more certain and unique "fingerprint" for a given device.

According to an embodiment of the present invention, a security checkpoint network can be used to triangulate the location of a particular mobile device. In a preferred embodiment, multiple security checkpoints can use relative signal strength comparisons to determine the location of a detected mobile device. Similarly, by using even one security checkpoint hardware apparatus, that security checkpoint hardware apparatus can determine the relative location of a detected mobile device based on the strength of the signal being emitted by that mobile device. In some cases, the relative location of the detected mobile device may be enough to indicate whether the detected mobile device is inside or outside of a home.

According to an embodiment of the present invention, the database of fingerprints enables the filtering and sorting of data to determine movement patterns and potentially early warning of crimes. In a preferred embodiment, the database can be filtered to see what devices were in an area when a crime occurred and whether any of those same devices were in a different area when a similar crime occurred. This information can then be used to provide an alert when any of those devices enter an area that is covered by one of the security checkpoints that are integrated with the database.

According to an embodiment of the present invention, the security checkpoint hardware apparatus may be integrated with other security devices. As an illustrative example, the security checkpoint hardware apparatus could be integrated with security cameras. When a foreign device is detected by the security checkpoint, the security checkpoint could cause the video feed from a nearby camera to be brought to the attention of the appropriate person, including playback of video preceding the initial detection of the foreign device. Similarly, the security checkpoint could integrate with other sensors alarms including motion detectors, glass break sensors, and door alarms such that a list of devices in the vicinity are automatically recorded whenever one of those alarms is tripped. Additionally, the security checkpoint could be integrated with local law enforcement and emergency radio and dispatch frequencies, thereby allowing the system to provide alerts to users or gather information about devices that are in an area when a crime is reported. One of ordinary skill in the art would appreciate there are many type of security devices the security checkpoint hardware apparatus could be integrated with and embodiments of the present invention are contemplated for use with any such security device.

According to an embodiment of the present invention, the security checkpoint hardware apparatus may employ strategies that encourage nearby devices to provide information to the security checkpoint hardware apparatus. In a preferred embodiment, a security checkpoint hardware apparatus can emit specific signals to appear to a mobile device as though the security checkpoint hardware apparatus is a specific service, for example a WiFi® connection. By encouraging a mobile device to provide more detailed information, for example such device's wireless MAC address, a more accurate "fingerprint" can be developed for the mobile device in question.

According to an embodiment of the present invention, the systems and methods described herein that provide the "fingerprint" for the mobile device may be implemented through the use of a device fingerprinting module. In a preferred embodiment, the device fingerprinting module is configured to generate a unique identification or "fingerprint" of a mobile device based upon identifiers contained within the radio signals emitted by that device. In the preferred embodiment, the device fingerprinting module is further configured to integrate the security checkpoint hardware apparatus with other security devices, such as security cameras and alarm systems. One of ordinary skill in the art would appreciate that a device fingerprinting module could be configured to accomplish a variety of security-related tasks, and embodiments of the present invention are contemplated for use with any such task.

Exemplary Embodiments

Turning to FIG. 2, the radio antenna (or wireless access point) 207 will listen to common wireless protocols and frequencies such as those specified by 802.11 and Bluetooth specifications. Additionally, in some embodiments, the radio antenna (or wireless access point) 207 may also broadcast specific information designed to elicit uniquely identifying information from wireless devices, such as broadcasting the name of a network recognized by mobile devices as an 802.11 access point. In some such embodiments, the radio antenna (or wireless access point) 207, communicates with the mobile devices with the sole intent of collecting their identifying information. In some embodiments, the radio antenna (or wireless access point) 207 terminates any additional communication to ensure that it does not reduce the quality of service of non-security threats, such as the homeowners near the security checkpoint.

Figure 3:
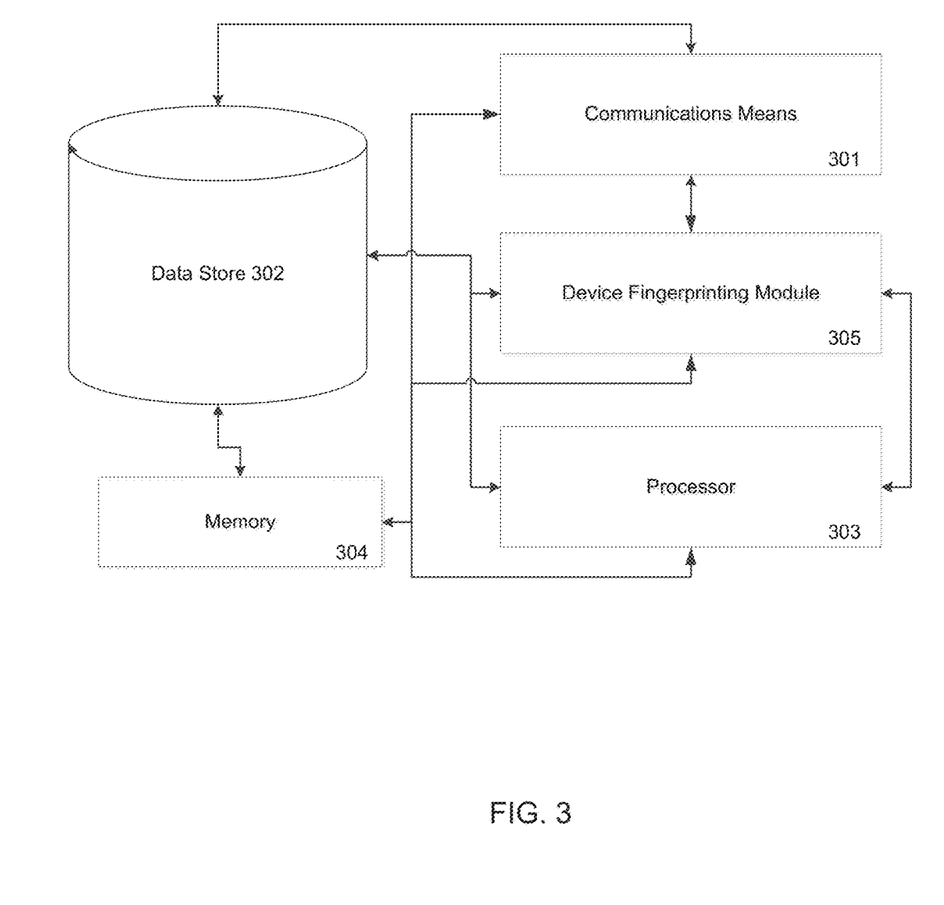
FIG. 3 illustrates a schematic of a system for a security checkpoint using radio signals, in accordance with embodiments of the present invention.

Turning to FIG. 3, according to an embodiment of the present invention, a system for a security checkpoint using radio signals is comprised of one or more communications means 301, one or more data stores 302, a processor 303, memory 304, and a device fingerprinting module 305. In alternate embodiments, the system may have additional or fewer components. One of ordinary skill in the art would appreciate that the system may be operable with a number of optional components, and embodiments of the present invention are contemplated for use with any such optional component.

Figure 4:
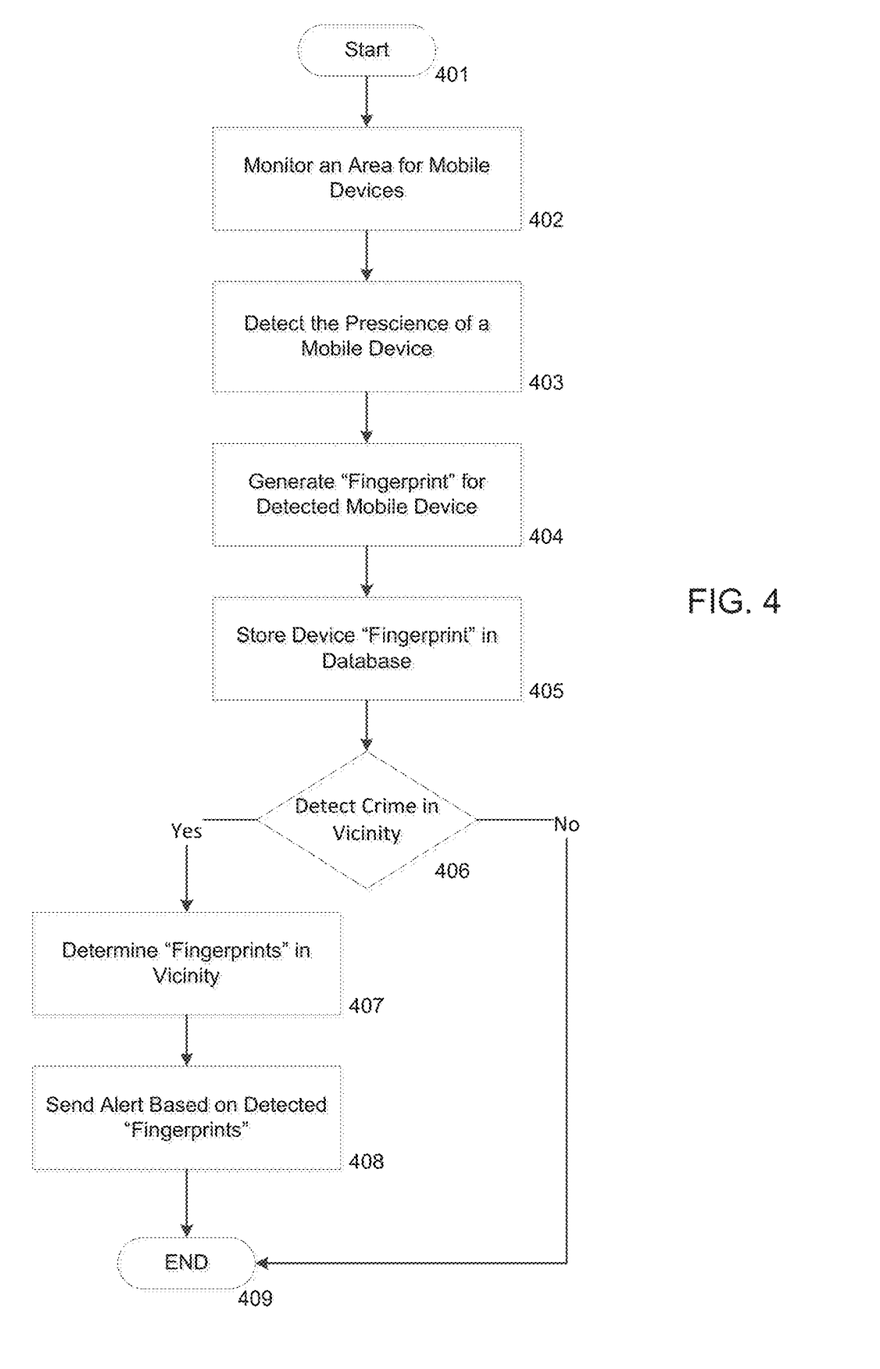
FIG. 4 is a process flow of an exemplary method for a security checkpoint using radio signals in accordance with, in accordance with embodiments of the present invention.

Turning now to FIG. 4, an exemplary method for a security checkpoint using radio signals in accordance with an embodiment of the present invention. As shown in FIG. 4, an area is monitored for the presence of a mobile device. When a device is detected, the device fingerprinting module generates a unique "fingerprint" that uniquely identifies the mobile device and that "fingerprint" can be stored in a database. In the preferred embodiment, the security checkpoint is integrated with other security devices and information sources to know when a possible crime has occurred. When crime or similar security event is detected, the security checkpoint can check for what mobile devices are in the vicinity. In particular, the security checkpoint can determine whether any foreign or unrecognized devices are in the area and flag those for further consideration. Additionally, the security checkpoint can filter and compare information in the database to determine if there is any correlation or pattern between the mobile device(s) that were in the vicinity at similar crimes. The security checkpoint can then use that pattern information to provide alerts to citizens and law enforcement when one of those flagged device(s) enters a monitored area.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for a security checkpoint using radio signals, said system comprising:
   a wireless signal receiver;
   a device fingerprinting module comprising computer executable code stored in non-volatile memory;
   a processor;
   a memory;
   and a communications means,
   wherein said wireless signal receiver, said device fingerprinting module, said processor, said memory, and said communications means are operably connected and are configured to:
   monitor an area for the presence of a mobile phone device;
   detect one or more radio signals emitted by said mobile phone device;
   generate a device fingerprint that uniquely identifies said mobile phone device based on unique identifiers within the radio frequency signals generated by said mobile phone device, wherein said device fingerprint comprises said unique radio frequency identifiers, a media access control (MAC) address, hardware identification, and network ID;
   upload said device fingerprint to a device fingerprint database to be accessed by a network of other security checkpoints, wherein each of said security checkpoints in said network is configured to capture and contribute certain details about said mobile phone device that were not captured by other checkpoints in the network thereby creating a more certain and unique device fingerprint for said mobile phone device;
   determine whether said device fingerprint matches the device fingerprint of any recognized mobile phone device stored in said device fingerprint database; and
   issue an alert notification if said mobile phone device fingerprint does not match the device fingerprint of any mobile phone device stored in said device fingerprint database.

2. The system of claim 1, wherein said wireless signal receiver, said device fingerprinting module, said processor, said memory, and said communications means are operably connected and are further configured to:
   receive an alarm notification from one or more security devices;
   record all mobile devices that are in range of said system as potential suspect devices;
   compare said potential suspect devices against recognized devices in said device fingerprint database; and
   generate a list of one or more suspect devices.

3. The system of claim 2, wherein said wireless signal receiver, said device fingerprinting module, said processor, said memory, and said communications means are operably connected and are further configured to issue an alert when one or more of said suspect devices enters any of said security checkpoint on said network.

4. The system of claim 2, wherein said wireless signal receiver, said security devices are one or more of a group of security devices consisting of security cameras, motion detectors; glass break alarms; and open/close sensors.

5. The system of claim 1, wherein said wireless signal receiver, said security checkpoint forms a swarm with other security checkpoints connected to a common network.

6. The system of claim 5, wherein said wireless signal receiver, said device fingerprinting module, said processor, said memory, and said communications means are operably connected and are further configured to issue alerts between each of said security checkpoints on said common network when an unrecognized device is detected by any of said checkpoints on said common network.

7. The system of claim 5, wherein said wireless signal receiver, said device fingerprinting module, said processor, said memory, and said communications means are operably connected and are further configured to triangulate a location of said mobile device.

8. The system of claim 1, wherein each of said security checkpoints in said network communicates with other sensors alarms including motion detectors, glass break sensors, and door alarms, wherein any mobile devices detected in the vicinity are automatically recorded when one of said sensor alarms is tripped.

9. A method for a security checkpoint using radio signals, said method comprising:
   monitoring an area for the presence of a mobile phone device;
   detecting one or more radio signals emitted by said mobile phone device;
   generating a device fingerprint based on unique identifiers within the radio frequency signals generated by said mobile phone device that uniquely identifies said mobile phone device, wherein said device fingerprint comprises said unique radio frequency identifiers, a media access control (MAC) address, hardware identification, and network ID;

uploading said device fingerprint to a device fingerprint database to be accessed by a network of other security checkpoints, wherein each of said security checkpoints in said network is configured to capture and contribute certain details about said mobile phone device that were not captured by other checkpoints in the network thereby creating a more certain and unique device fingerprint for said mobile phone device;

determining whether said device fingerprint matches the device fingerprint of any recognized mobile phone device stored in said device fingerprint database; and issuing an alert notification if said mobile phone device fingerprint does not match the device fingerprint of any mobile phone device stored in said device fingerprint database.

10. The method of claim 9, further comprising the steps of:

receiving an alarm notification from one or more security devices;

recording all mobile devices that are in range of said system as potential suspect devices;

comparing said potential suspect devices against recognized devices in said device fingerprint database; and generating a list of one or more suspect devices.

11. The method of claim 10, further comprising the step of issuing an alert when one or more of said suspect devices enters any of said security checkpoints on said network.

12. The method of claim 9, further comprising the step of issuing alerts between each security checkpoint on a common network when an unrecognized device is detected by any of said checkpoints on said common network.

13. The method of claim 9, further comprising the step of triangulating a location of said mobile device using a network of security checkpoints.

* * * * *